United States Patent [19]

Ciavarella

[11] Patent Number: 4,562,649
[45] Date of Patent: Jan. 7, 1986

[54] ADJUSTABLE CARPENTER SQUARE

[76] Inventor: Frank Ciavarella, 2605 Tibbets Wick Rd., Hubbard, Ohio 44425

[21] Appl. No.: 706,781

[22] Filed: Feb. 28, 1985

[51] Int. Cl.⁴ .............................................. B43L 7/06
[52] U.S. Cl. ...................................... 33/419; 33/465; 33/472; 33/497
[58] Field of Search ................. 33/419, 452, 458, 465, 33/471, 472, 473, 495–500, 422, 424, 403 N, 427

[56] References Cited
U.S. PATENT DOCUMENTS

| 397,128 | 2/1889 | Hester | 33/500 |
| 843,459 | 2/1907 | Humes . | |
| 1,086,545 | 2/1914 | Meister et al. . | |
| 1,139,648 | 5/1915 | Demmer . | |
| 2,972,816 | 2/1961 | Richardson | 33/403 X |
| 3,065,546 | 11/1962 | Brocklander . | |

Primary Examiner—Harry N. Haroian
Attorney, Agent, or Firm—Harpman & Harpman

[57] ABSTRACT

An adjustable carpenter square for use in determining the relative angles between two predetermined points defined by a pair of longitudinal extensions pivotally attached together at one end.

4 Claims, 6 Drawing Figures

ADJUSTABLE CARPENTER SQUARE

BACKGROUND OF THE INVENTION

1. Technical Field

This invention relates to devices used to determine relative angles from a predetermined point.

2. Description of the Prior Art

Prior art devices of this type have relied on a variety of different structural configurations. See for example U.S. Pat. Nos. 1,139,648, 1,086,545, 843,459 and 3,065,546.

In U.S. Pat. No. 1,139,648, a combination tool is disclosed having a fixed right angular square with a large circular opening at the base with a disc-like portion so the same will revolve showing the relative angle.

In U.S. Pat. No. 1,086,545, a ruler is shown having a ring defining a protractor hinged from which extends two ruler elements.

U.S. Pat. No. 843,459 defines a combination ruler and square in which two main members are pivoted together at one end with a locking screw therebetween.

U.S. Pat. No. 3,065,546 discloses an extension ruler having an elongated center portion which is pivoted at one end being movable outwardly from the ruler with a track member therebetween indicating the relative degrees between the two extensions.

SUMMARY OF THE INVENTION

An adjustable carpenter square for use in finding the relative angles from a given point using a pair of longitudinally extensible arms pivoted together at one end. The relative angle between the arms can be determined regardless of the arm position by use of multiple indicia readings on a degree ring therebetween.

DESCRIPTION OF THE PREFERRED EMBODIMENT

Figure 1:
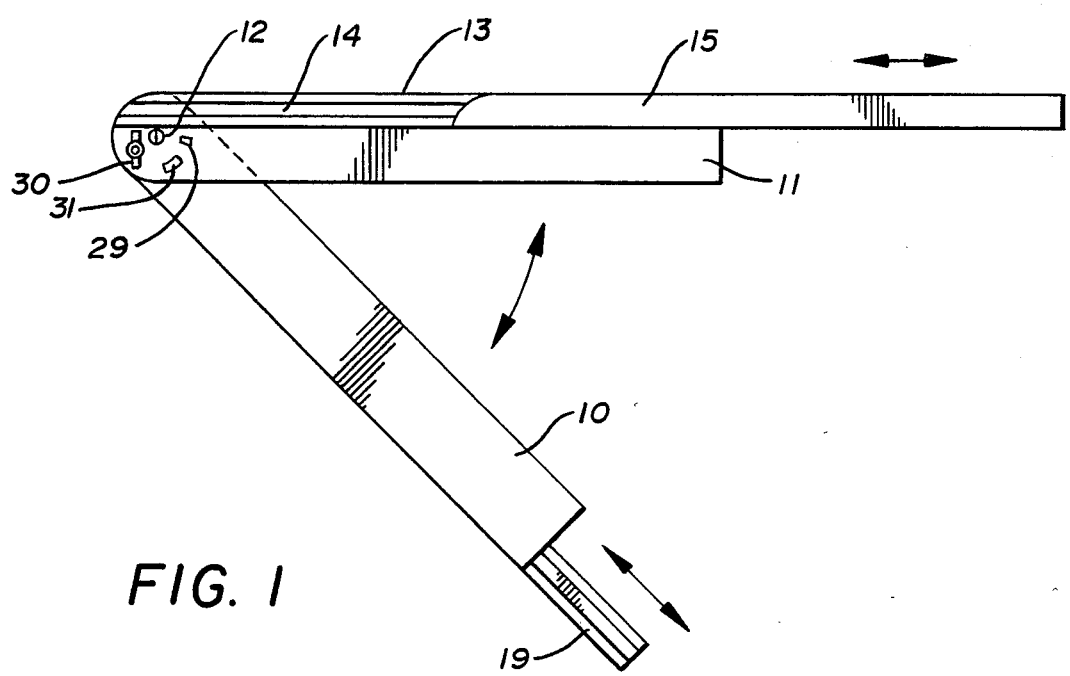
FIG. 1 is a top plan view of the adjustable square.
Figure 6:
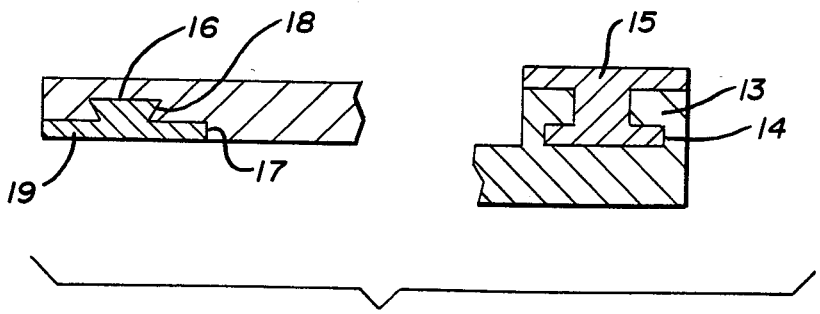
FIG. 6 is an end view of the carpenter square.

An adjustable square can be seen in FIG. 1 of the drawings having a pair of longitudinally extending arms 10 and 11 pivotally secured to one another adjacent one end by a pivot point 12. A raised track 13 extends along the entire length of said longitudinally extending arm 11 defining an inverted T-shaped slot 14. An arm extension 15 is registrable within said slot and provides a straight edge extension of said longitudinally extending arm 11 as best seen in FIGS. 1 and 6 of the drawings.

A second slot 16 is formed in a recessed area 17 on the underside of said longitudinally extending arm 10 and has a keyed configuration 18 in which a secondary arm extension 19 is positioned to provide a straight edge extension to the arm.

Both the arm extension 15 and the secondary arm extension 19 are movable within their respective slots as will be apparent to one skilled in the art.

Figure 2:
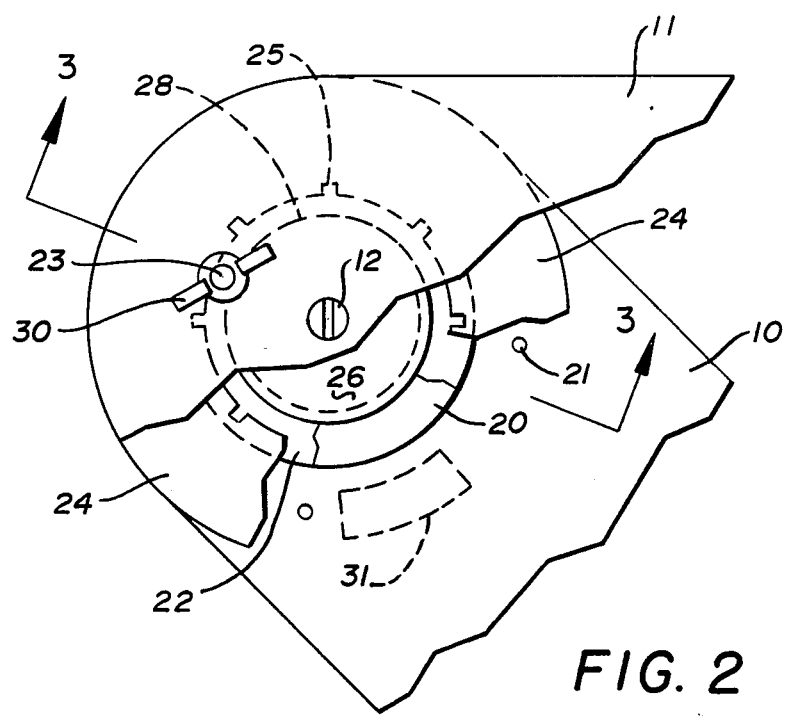
FIG. 2 is an enlarged portion with parts broken away of the square.
Figure 3:
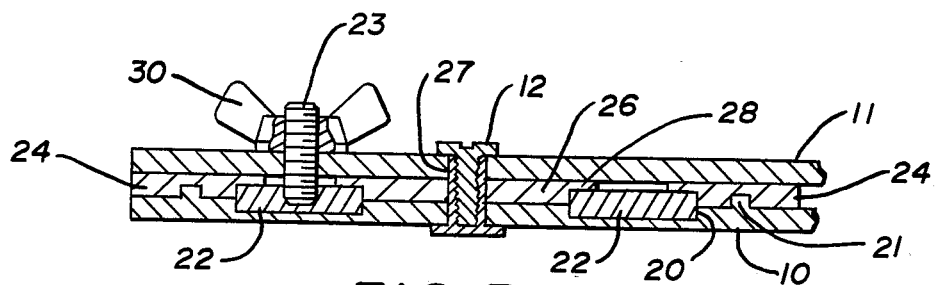
FIG. 3 is a section on lines 3—3 of FIG. 2.
Figure 4:
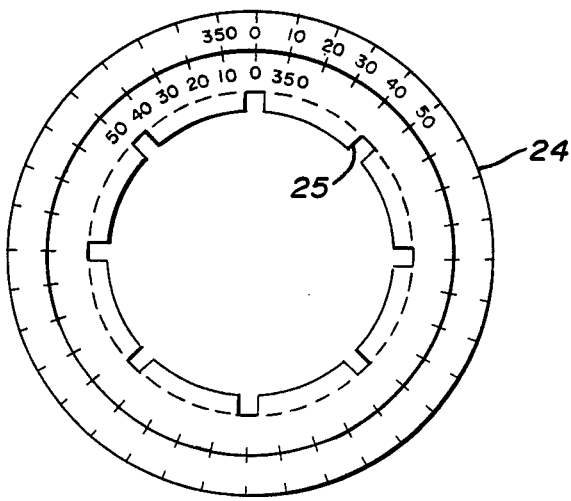
FIG. 4 is a top plan view of a degree ring.

Referring now to FIGS. 2, 3 and 4 of the drawings, a degree and lock assembly is shown wherein an annular recessed area 20 is centered around the pivot point 12 in the longitudinally extending arm 10 with a plurality of alignment pins 21 positioned thereabout. A locking support ring 22 is positioned partially within said recessed area 20 and has a threaded locking stud 23 extending therefrom. A degree indicator ring 24 having a dual opposing degree indicia thereon is positioned over and registers with the alignment pins 21 with a portion of the degree ring overlapping said locking support ring 22 as best seen in FIG. 3 of the drawings. The degree ring has a series of spaced notches 25 in the overlapping portion that corresponds to preselected degree indica such as 0, 45, and 90, etc. A bearing cap spacer 26 having a central aperture at 27 and a recessed edge portion 28 is positioned on the pivot point 12 overlapping said support locking ring 22. It should be noted that the portions of the bearing lock cap spacer 27 and the degree ring 24 overlapping said support ring 22 do not touch providing an opening for said lock stud 23 to extend through.

Figure 5:
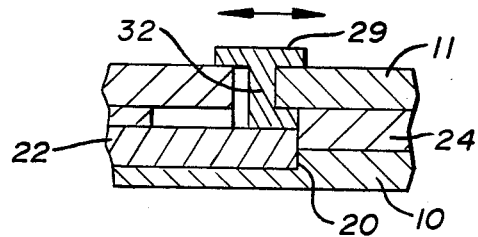
FIG. 5 is a section with portions broken away.

Referring to FIG. 5 of the drawings, a locking button 29 can be seen having an L-shaped body member 32, the lower portion of which is registrable within said notches 25 locking said longitudinally extending arms 10 and 11 in preselected positions corresponding to incremental degree variants. The locking button 29 has a T-shaped upper portion that overlies the longitudinally extending arm 11 and abuts a portion of the locking support ring 22. It will be evident from the above description that by moving said button as indicated by the arrow in FIG. 5 of the drawings, that the same will register in an aligned notch 25.

Referring now to FIGS. 2 and 3 of the drawings, the threaded locking stud 23 has a wing nut 30 secured to its free end in engaging relation to said longitudinally extending arm 11.

It will be seen that upon movement of said arms 10 and 11 to the desired position that the wing nut 30 can be tightened securely locking the arms 10 and 11 in the chosen position by compression of the arm 11 against the degree ring 24 which is affixed to the arm 10 as hereinbefore described.

An opening 31 (indicated in broken lines in FIG. 2) in the arm 11 provides a viewing port exposing a portion of the degree ring indicating the relative relationships by degrees between the arms 10 and 11.

Referring back to FIG. 4 of the drawings, the degree ring 24 has two bands of degree indicia thereof ranging from 0–360° to 0–360°, the second band being directly next to the first with the 10° indication on the first band corresponding to the 350° indication on the second band. This positioning provides proper readings regardless whether the arm 10 or 11 is used as a base from which the angle is to be determined.

It will thus be seen that a new and novel adjustable square has been illustrated and described and it will be apparent to those skilled in the art that various changes and modifications may be made herein without departing from the spirit of the invention and having thus described my invention what I claim is:

1. An adjustable carpenter square used for finding the relative angles from a given point comprises a pair of longitudinally extending arms pivoted together in overlapping relationship at one end, a locking support ring movably positioned between said longitudinal arms, said locking support ring having a locking stud extending therefrom with means on said locking stud for engaging one of said longitudinally extending arms, means for positioning said locking ring between said longitudinally extending arms, a degree ring secured to one of said longitudinally extending arms in overlying relationship to said locking support ring, means for positioning said longitudinally extending arms in predetermined fixed position, said positions corresponding to a given relative angle therebetween expressed in degrees.

2. The adjustable carpenter square of claim 1 including means for extending said arms independently from one other comprising arm extensions movable positioned within a slot in each of said longitudinally extending arms.

3. The adjustable carpenter square of claim 1 wherein said means on said lock stud for engaging one of said elongated extension arms comprises a wing nut for compressing said longitudinally extending arms against one another.

4. The adjustable square of claim 1 wherein said means for positioning said locking ring between said longitudinally extending arms comprises an annular recessed area in one of said longitudinally extending arms.

* * * * *